US012791982B2

(12) United States Patent
Kurokawa et al.

(10) Patent No.: US 12,791,982 B2
(45) Date of Patent: Nov. 10, 2026

(54) TIMEPIECE COMPONENT, CASE, TIMEPIECE AND TIMEPIECE COMPONENT MANUFACTURING METHOD

(71) Applicant: CASIO COMPUTER CO., LTD., Tokyo (JP)

(72) Inventors: Tomoyasu Kurokawa, Kokubunji (JP); Takayuki Satou, Uenohara (JP); Hiroki Nishiyama, Fussa (JP)

(73) Assignee: CASIO COMPUTER CO., LTD., Tokyo (JP)

(*) Notice: Subject to any disclaimer, the term of this patent is extended or adjusted under 35 U.S.C. 154(b) by 333 days.

(21) Appl. No.: 18/470,880

(22) Filed: Sep. 20, 2023

(65) Prior Publication Data

US 2024/0103444 A1 Mar. 28, 2024

(30) Foreign Application Priority Data

Sep. 26, 2022 (JP) ................................ 2022-152795

(51) Int. Cl.
*G04B 37/00* (2006.01)
*G04B 37/22* (2006.01)

(52) U.S. Cl.
CPC ......... *G04B 37/0008* (2013.01); *G04B 37/22* (2013.01)

(58) Field of Classification Search
CPC .... G04B 37/0008; G04B 37/22; G04G 19/00; G04G 17/06; G04G 17/04; H01R 12/777; H01R 31/06
See application file for complete search history.

(56) References Cited

U.S. PATENT DOCUMENTS

| | | | | |
|---|---|---|---|---|
| 2017/0212474 | A1* | 7/2017 | Iguchi | G04B 37/084 |
| 2019/0006775 | A1* | 1/2019 | Kan | H01R 11/28 |
| 2019/0051975 | A1* | 2/2019 | Hasei | G06F 1/1635 |
| 2020/0301368 | A1* | 9/2020 | Hurni | G04B 47/044 |
| 2022/0291635 | A1 | 9/2022 | Nagasawa et al. | |

FOREIGN PATENT DOCUMENTS

| | | | |
|---|---|---|---|
| JP | S63179745 | U | 11/1988 |
| JP | 2003-56782 | A | 2/2003 |
| JP | 2003324397 | A | 11/2003 |

(Continued)

OTHER PUBLICATIONS

Japanese Notice of Reasons for Refusal dated Aug. 18, 2026 received in Japanese Patent Application No. 2022-152795.

*Primary Examiner* — Edwin A. Leon
(74) *Attorney, Agent, or Firm* — Scully, Scott, Murphy & Presser, P.C.

(57) ABSTRACT

A timepiece component is described. The timepiece component includes a back cover which is a circumferential rim base that is provided with an attachment hole and attached to a wristwatch case, a terminal attachment member which is arranged in and attached to the attachment hole of the back cover, and charging terminals which are provided in the terminal attachment member and exposed therefrom. The terminal attachment member is made of insulative first resin, the back cover is made of conductive second resin, and a welding layer lies between the terminal attachment member and the back cover. As a result, the circumferential rim base and each terminal are prevented from being electrically connected to each other.

7 Claims, 9 Drawing Sheets

(56) References Cited

FOREIGN PATENT DOCUMENTS

| | | | |
|---|---|---|---|
| JP | 3966069 | B2 | 8/2007 |
| JP | 2012-36248 | A | 2/2012 |
| JP | 2018169360 | A | 11/2018 |
| JP | 6829136 | B2 | 2/2021 |
| JP | 2022139214 | A | 9/2022 |
| JP | 7274106 | B2 | 5/2023 |

* cited by examiner

TIMEPIECE COMPONENT, CASE, TIMEPIECE AND TIMEPIECE COMPONENT MANUFACTURING METHOD

CROSS-REFERENCE TO RELATED APPLICATION

This application is based upon and claims the benefit of priority from the prior Japanese Patent Application No. 2022-152795, filed Sep. 26, 2022, the entire contents of which are incorporated herein by reference.

BACKGROUND

1. Technical Field

The present disclosure relates to a timepiece component, a case, a timepiece and a timepiece component manufacturing method.

2. Description of the Related Art

For example, a wristwatch is known which has abase serving as a housing and made of conductive material such as metal or conductive resin including carbon resin in order to achieve slimming down and weight saving, as described in Japanese Patent Application Laid-Open (Kokai) Publication No. 2018-169360.

SUMMARY

An embodiment of the present disclosure is a timepiece component comprising: a circumferential rim base which is provided with an attachment hole and attached to a case; a center base which is arranged in the attachment hole of the circumferential rim base so as to be attached to the circumferential rim base; and a terminal provided in the center base in a manner to be exposed from the center base, wherein the center base is formed of insulative first resin, wherein the circumferential rim base is formed of conductive second resin, and wherein the center base and the circumferential rim base have a welding layer therebetween, or are integrally formed by an outer circumferential surface of the center base and an outer circumferential surface of the circumferential rim base being welded to each other.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENT

An embodiment of a wristwatch in which the present disclosure has been applied will hereinafter be described with reference to FIG. 1 to FIG. 9.

Figure 1:
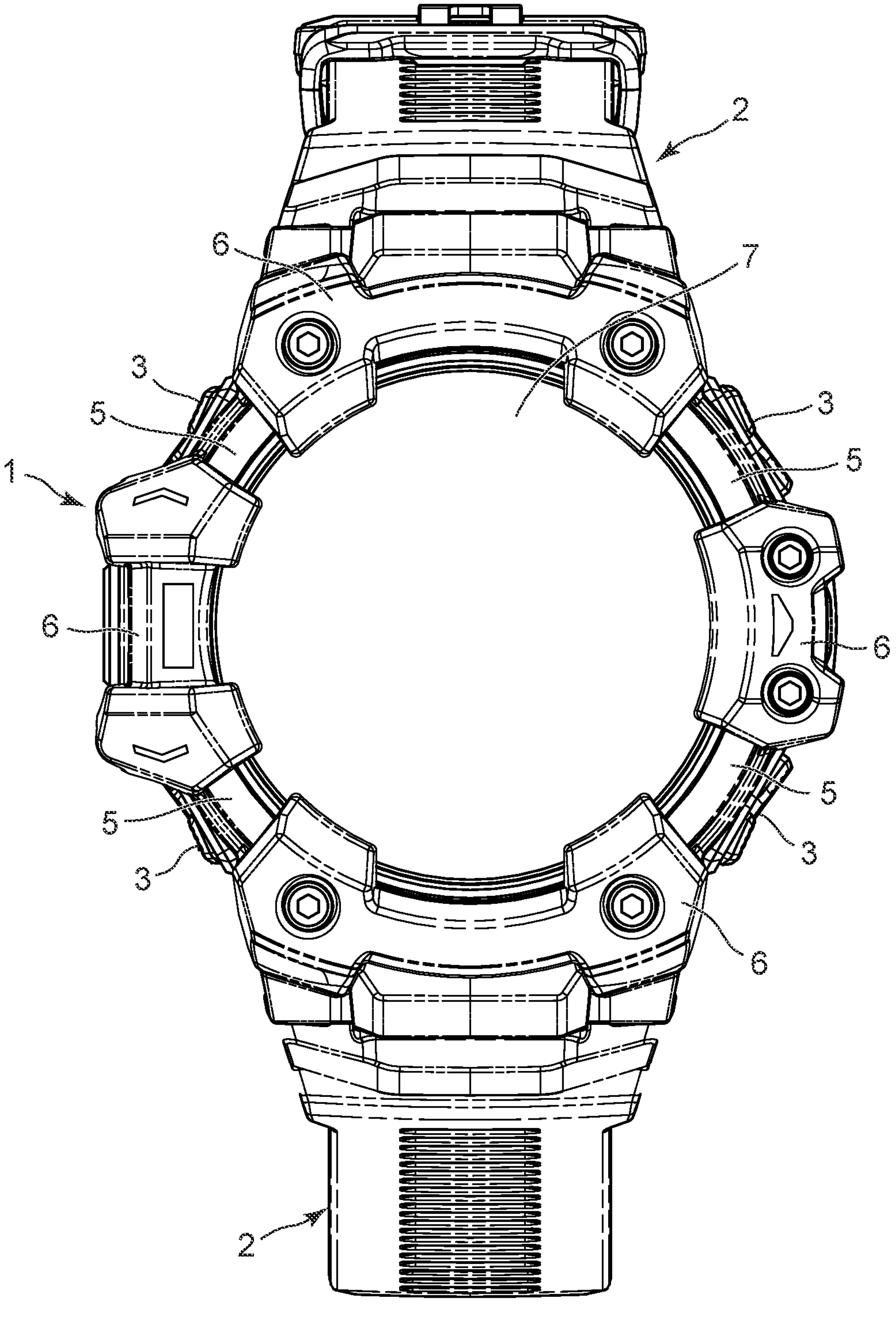
FIG. 1 is an enlarged front view of an embodiment in which the present disclosure has been applied in a wristwatch.
Figure 2:
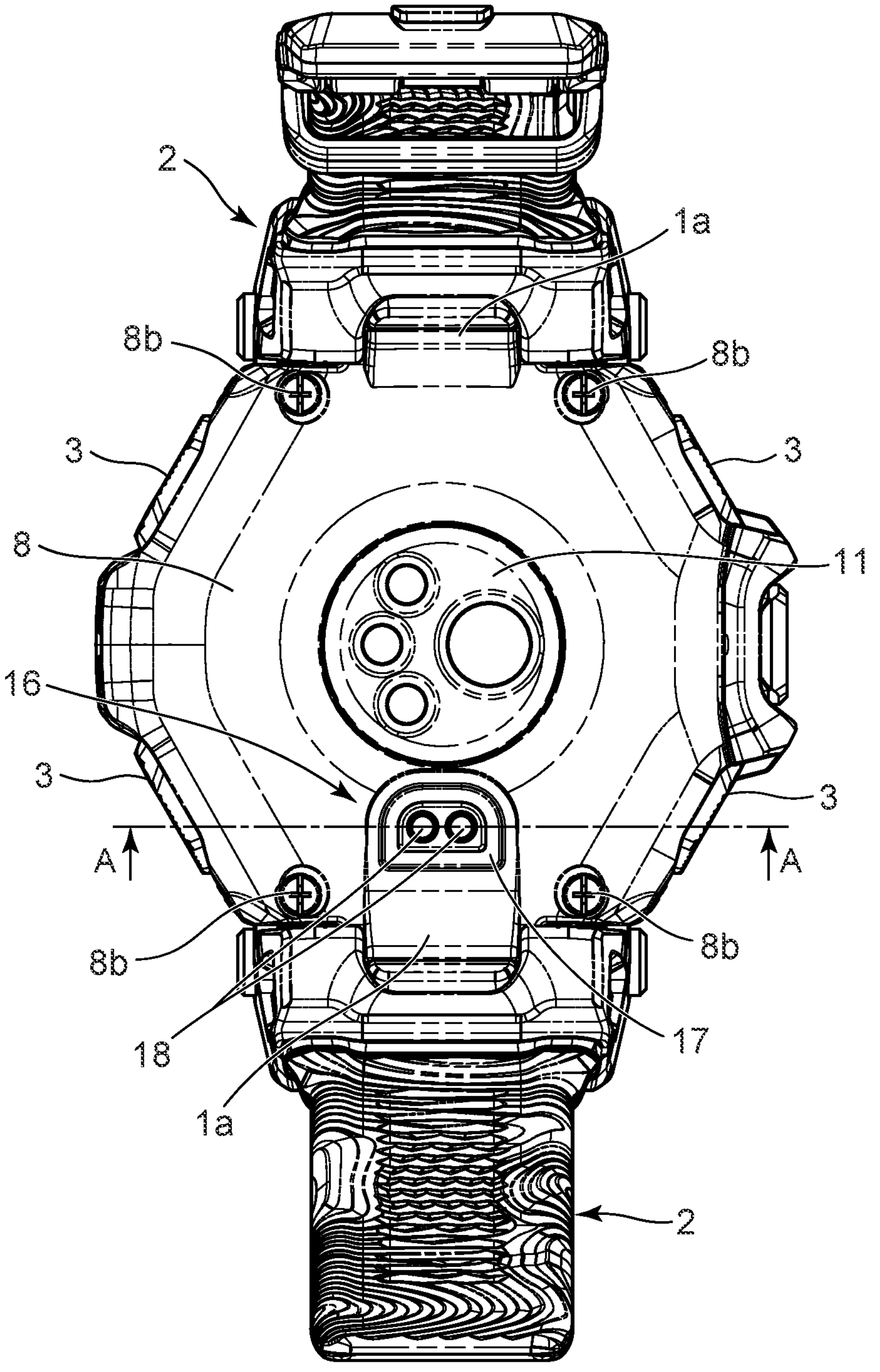
FIG. 2 is an enlarged back view of the wristwatch shown in FIG. 1.

This wristwatch includes a wristwatch case 1, as shown in FIG. 1 and FIG. 2. To the six o'clock side and twelve o'clock side of the wristwatch case 1, band attachment sections 1*a* (refer to FIG. 2) to which watch bands 2 are attached are provided. Also, on the two o'clock side, four o'clock side, eight o'clock side, and ten o'clock side of the wristwatch case 1, switch sections 3 are provided, respectively.

Figure 3:
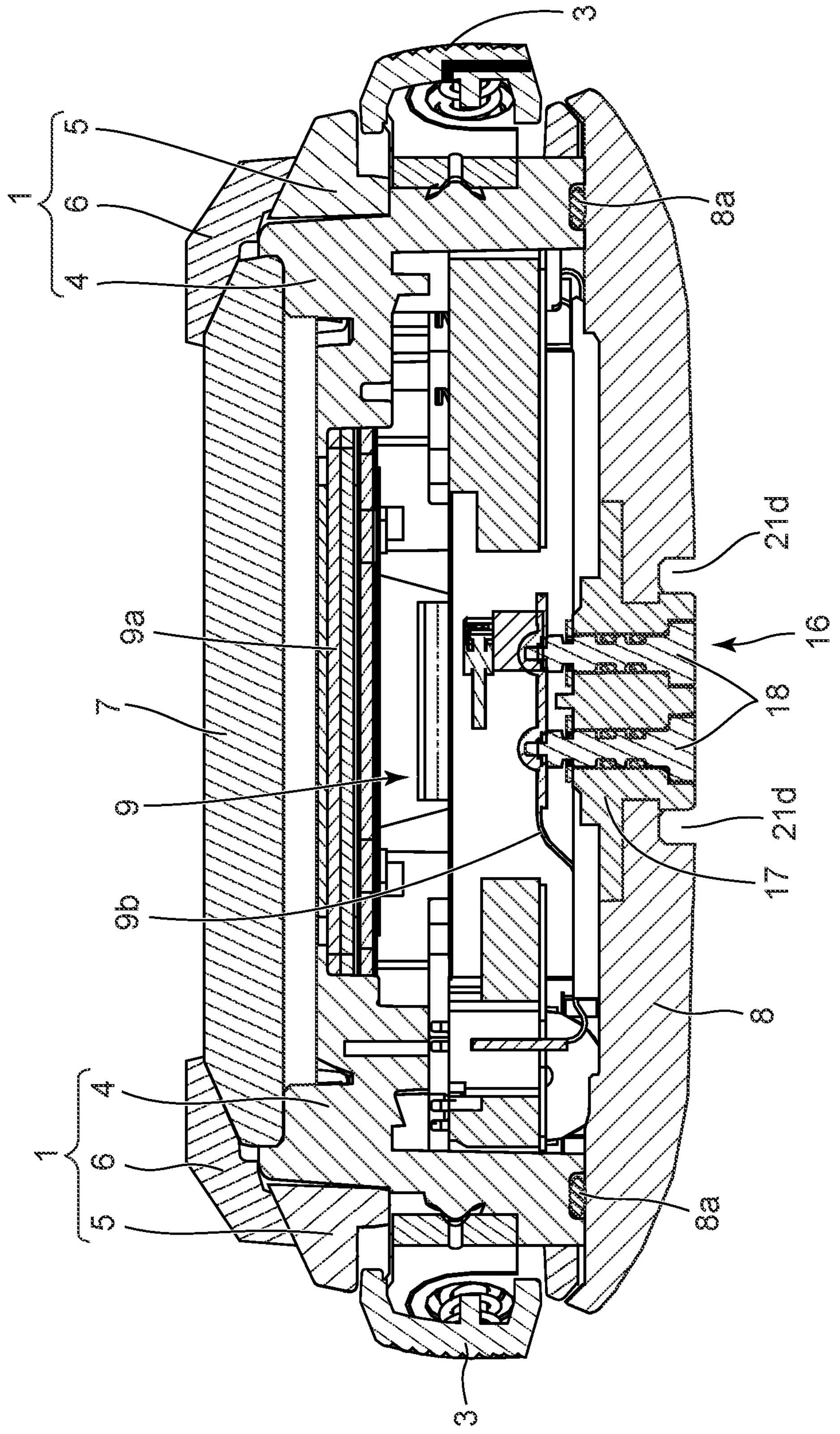
FIG. 3 is an enlarged cross-sectional view of the wristwatch inverted and taken along the A-A arrow view in FIG. 2.

This wristwatch case 1 includes a main body case 4, a first exterior case 5, and a second exterior case 6, as shown in FIG. 1 to FIG. 3. The main body case 4 is made of fiber-reinforced resin acquired by carbon fibers or glass fibers being mixed into resin serving as a base, and therefore is light and rigid. Note that the resin that serves as a base may be rigid polyamide. Also, this main body case 4 may be formed using not synthetic resin but metal.

The first exterior case 5 is made of a hard metal such as stainless steel or titanium alloy, and structured to be arranged covering the outer surface of the upper side of the main body case 4, as shown in FIG. 1 to FIG. 3. The second exterior case 6 is made of an elastic synthetic resin such as urethane resin, and structured to be attached to the outer circumferential part of the main body case 4 with part of the first exterior case 5 being exposed.

Also, to the upper opening of the wristwatch case 1, that is, to the upper opening of the main body case 4, a watch glass 7 is attached, as shown in FIG. 1 to FIG. 3. In addition, on the lower part of the wristwatch case 1, that is, on the lower part of the main body case 4, a back cover 8 which is the circumferential rim base of a timepiece component 16 described later is attached by a plurality of screws 8*b* via a waterproof ring 8*a*.

Furthermore, in the wristwatch case 1, a timepiece module 9 is provided, as shown in FIG. 3. Although not shown in the drawings, this timepiece module 9 includes various types of components required for timepiece functions, such as a timepiece movement which moves pointers to indicate the time, a display section 9*a* which electro-optically displays information such as a time of day, a date, and a day of the week, a circuit section which electrically controls the timepiece movement and the display section 9*a*, and a rechargeable battery which supplies electric power to the circuit section.

The back cover 8 has a substantially rectangular plate shape whose three o'clock side and nine o'clock side project in arch shapes. In a central portion of this back cover 9, a sensor device 11 is provided. This sensor device 11, which is an optical sensor for detecting a pulse rate and oxygen saturation in blood, includes a plurality of light emitting elements (not shown in the drawings) and a light receiving element (not shown in the drawings), and is electrically connected to the circuit section (not shown in the drawings) in the timepiece module 9. The plurality of light emitting elements emits light of a green wavelength, light of a red wavelength, and light of an infrared wavelength.

As a result, the sensor device 11 is structured such that light emitted by the plurality of light emitting elements is applied to blood vessels under the skin of an arm, reflected light resulting from the emitted light is received by the light receiving element, a pulse rate is detected on the basis of change in the received amount of reflected light of the green wavelength, and oxygen saturation in blood is detected on the basis of the ratio between transmitted light of the red wavelength and transmitted light of the infrared wavelength which have passed through the body, as shown in FIG. 2.

Figure 4:
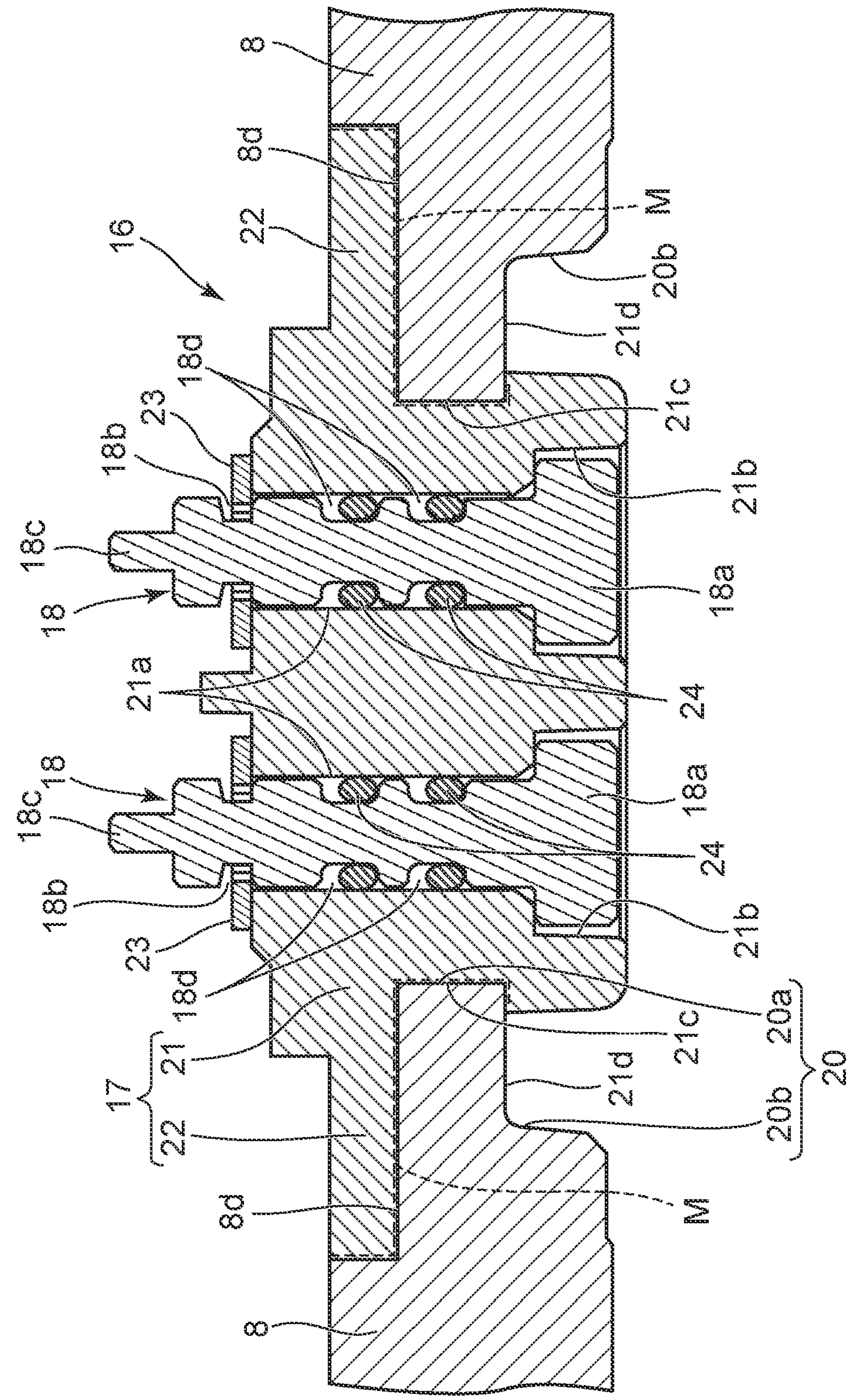
FIG. 4 is an enlarged cross-sectional view showing a main portion of the back cover of the wristwatch shown in FIG. 3.
Figure 6:
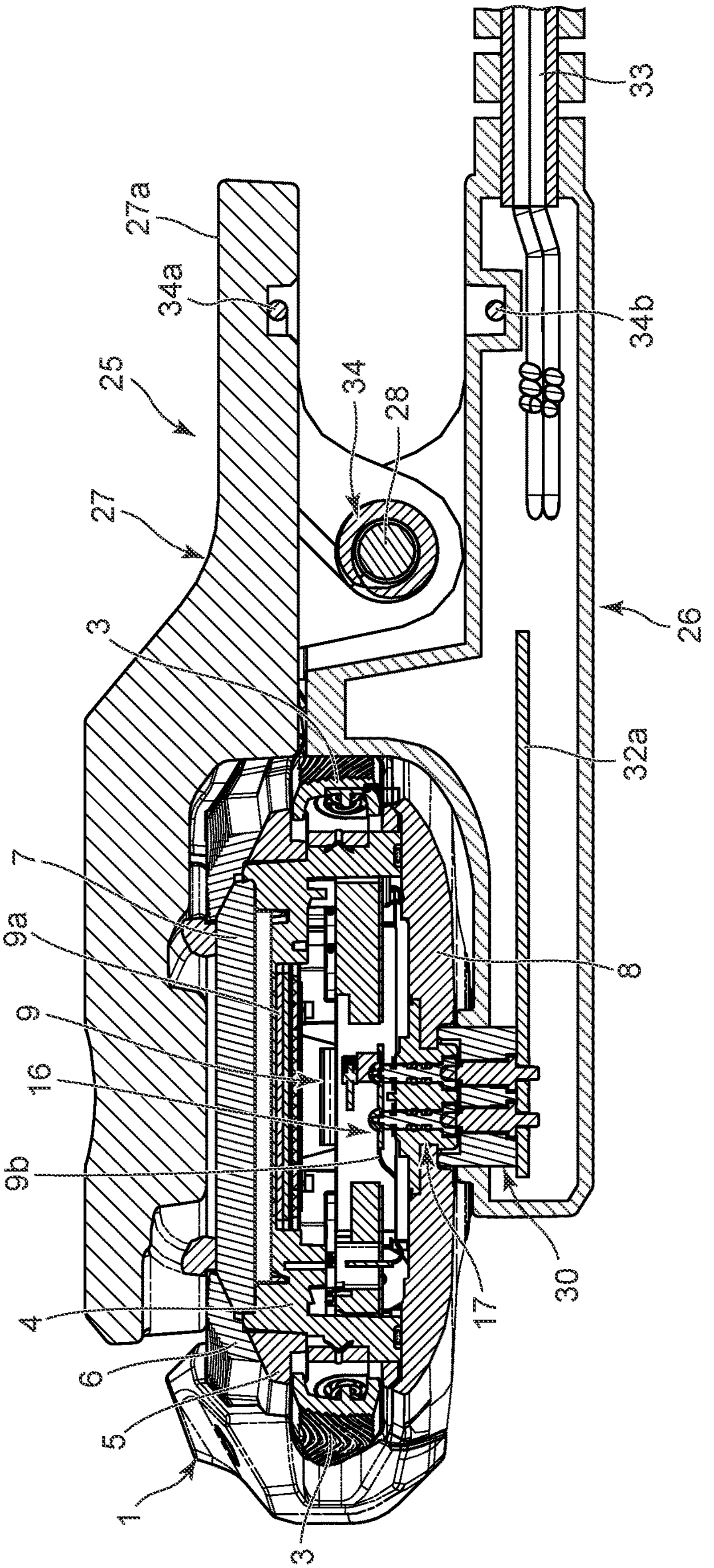
FIG. 6 is an enlarged cross-sectional view of the charging device taken along the B-B arrow view in FIG. 5.
Figure 7:
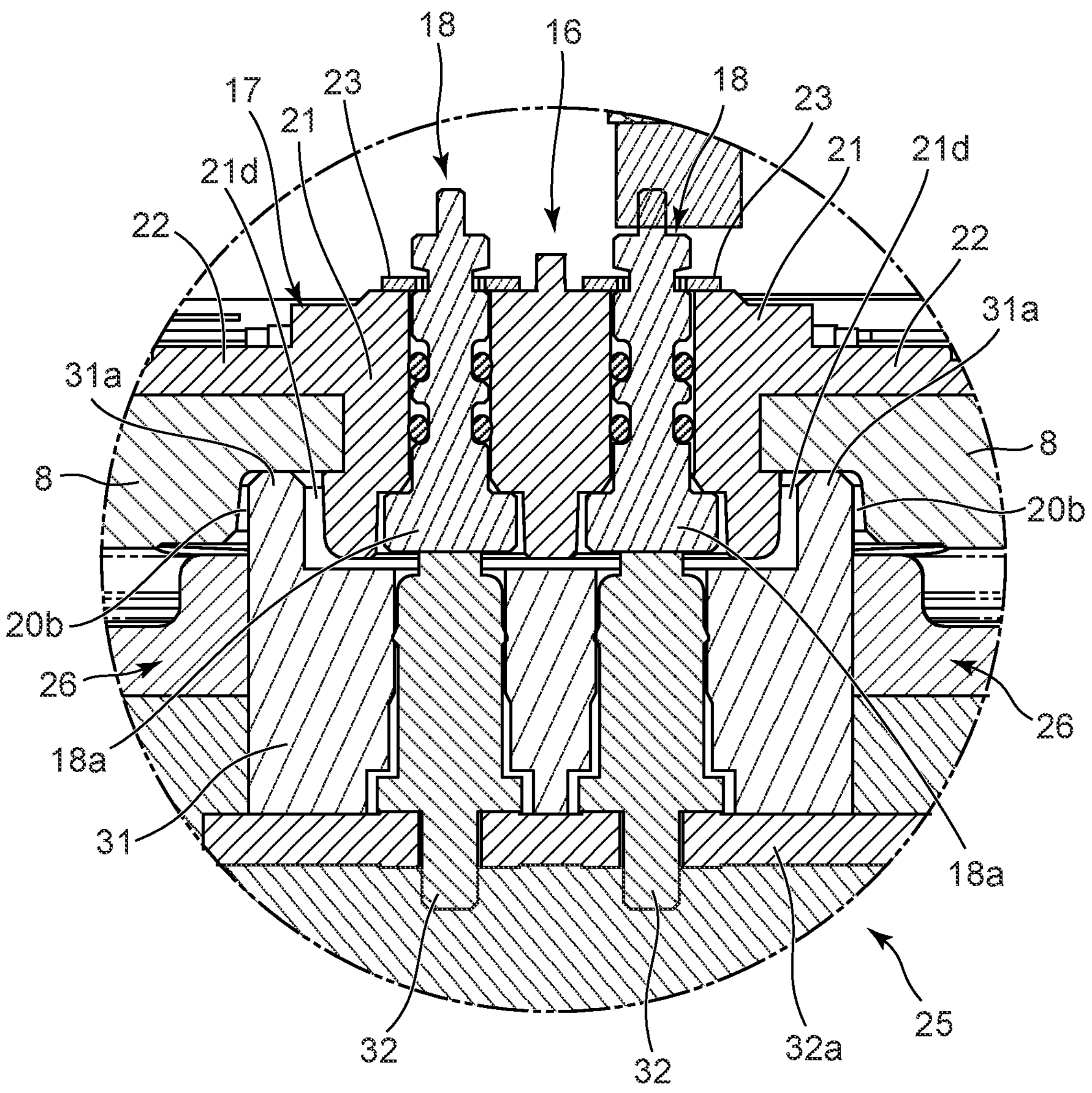
FIG. 7 is an enlarged cross-sectional view of a main portion showing the connection between the charging terminals of the wristwatch and the electrode terminals of the charging device in FIG. 6.

In the wristwatch case 1, the above-described timepiece component 16 is provided, as shown in FIG. 2 to FIG. 4. This timepiece component 16 includes the back cover 8 which serves as its circumferential rim base, a terminal attachment member 17 which serves as its center base that is attached to the six o'clock side of the inner surface (the upper surface in FIG. 6 and FIG. 7) of the back cover 8, and a plurality of charging terminals 18 that is attached to the terminal attachment member 17, as shown in FIG. 6 and FIG. 7.

As resin material for the back cover 8 that serves as the circumferential rim base, for example, fiber-reinforced resin whose rigidity and melting point are higher than those of resin material for the terminal attachment member 17 is used. Here, for example, carbon fibers are used as the reinforcement fibers therefor, and the back cover 8 is formed using carbon fiber resin acquired by carbon fibers being mixed into resin that serves as a base, as shown in FIG. 2 to FIG. 4. This resin that serves as the base may be polyamide resin. As a result, by the carbon fibers, the back cover 8 is formed to possess electrical conductivity.

On the six o'clock side of the back cover 8, an attachment hole 20 in which the terminal attachment member 17 is arranged is formed penetrating from the inner surface (upper surface in FIG. 3 and FIG. 4) of the back cover 8 to the outer surface (undersurface in FIG. 3 and FIG. 4) which is the back surface of the wristwatch, as shown in FIG. 3 and FIG. 4. This attachment hole 20 is a rectangular through hole which is long from the five o'clock side toward the seven o'clock side and whose four corners are rounded. That is, this attachment hole 20 has a substantially ellipse shape. Also, this attachment hole 20 has a small-diameter hole section 20*a* on the inner surface side (upper surface side) of the back cover 8 and a large-diameter hole section 20*b* on the outer surface side (undersurface side) of the back cover 8.

The terminal attachment member 17 is formed using insulative resin material that serves as a base, as shown in FIG. 3 and FIG. 4. This resin material, which serves as the base, may be rigid polyamide resin or glass fiber resin acquired by glass fibers being mixed into polyamide resin. Also, the terminal attachment member 17 includes a main body 21 to which the plurality of charging terminals 18 is attached, and a flange 22 formed on the outer circumferential part of the main body 21. The main body 21 is structured to be arranged in the attachment hole 20 of the back cover 8.

More specifically, the main body 21 is formed in a substantially rectangular shape which is almost the same as the shape of the inner circumferential surface of the small-diameter hole section 20*a* of the attachment hole 20 in the back cover 8, as shown in FIG. 3 and FIG. 4. In the outer circumferential surface of the main body 21, a fitting recess section 21*c* is annularly formed in which the inner circumferential surface of the small-diameter hole section 20*a* of the attachment hole 20 in the back cover 8 is arranged by projecting thereinto. In an area between the outer circumferential surface of the lower part of the main body 21 and the inner circumferential surface of the large-diameter hole section 20*b* of the attachment hole 20 in the back cover 8, a restriction recess section 21*d* is formed into which a frame-shaped projection 31*a* on a connection body section 31 of a connection section 30 of a later-described charging device 25 is inserted.

Also, the main body 21 is formed such that, its vertical length (thickness) is longer (thicker) than the vertical length (depth) of the attachment hole 20 of the back cover 8, that is, the vertical length of the back cover 8, as shown in FIG. 3 and FIG. 4. As a result, the main body 21 is structured such that its upper surface is arranged to slightly project above the upper surface (inner surface) of the back cover 8 when its undersurface is flush with the undersurface of the back cover 8. In this main body 21, a plurality of through holes 21*a* to which the plurality of charging terminals 18 is attached is formed in a longitudinal direction.

On the other hand, the flange 22 is formed in a substantially rectangular frame shape whose outer shape is larger than the shape of the inner circumferential surface of the large-diameter hole section 20*b* of the attachment hole 20 in the back cover 8, as shown in FIG. 3 and FIG. 4. This flange 22 is provided projecting from the outer circumferential part of the main body 21 such that, when the lower side of the main body 21 is arranged in the small-diameter hole section 20*a* and the large-diameter hole section 20*b* of the attachment hole 20 in the back cover 8, the undersurface of this flange 22 is arranged on a counterbore surface of a counterbore section 8*d* formed in the upper surface of the back cover 8.

Also, this flange 22 is formed such that its vertical thickness is about one-third of the vertical thickness of the back cover 8, its upper surface is at the same height as the upper surface of the back cover 8, and the upper part of the main body 21 projects higher than the upper surface of the flange 22, as shown in FIG. 3 and FIG. 4. Moreover, this flange 22 is formed such that its sideward projecting length from the outer circumferential surface of the main body 21 is shorter than the length of the main body 21 in the thickness direction, and substantially equal to or longer than the length of the back cover 8 in the thickness direction. The terminal attachment member 17 herein is integrally formed with the back cover 8 by two-color molding.

More specifically, the terminal attachment member 17 is formed in advance by insulative resin. Then, when the back cover 8 is to be molded, portions of the terminal attachment member 17 which come in contact with the back cover 8, that is, the inner surface of the fitting recess section 21*c* in the outer circumferential surface of the main body 21 and the undersurface and side surface of the flange 22 corresponding to the counterbore surfaces of the back cover 8 are melted at the molding temperature of the back cover 8, whereby the terminal attachment member 17 and the back cover 8 are integrally formed via this molding layer S (refer to FIG. 9) formed by the melting, as shown in FIG. 3 and FIG. 4. As such, the terminal attachment member 17 and the back cover 8 are welded to each other via the molding layer S by an interface on the terminal attachment member 17 side among their welding surfaces M being melted, whereby high waterproofness to withstand a pressure of about twenty atmospheres is achieved.

The plurality of charging terminals 18 is each formed in a round bar shape so as to be inserted into the plurality of through holes 21*a* formed in the main body 21 of the terminal attachment member 17, as shown in FIG. 2 to FIG. 4. More specifically, each charging terminal 18 is formed such that its outer diameter is substantially equal to the inner diameter of each through hole 21*a* of the main body 21 and its vertical length is longer than the vertical length (thickness) of the main body 21.

At the lower end of each of the plural charging terminals 18, a head section 18*a* which has a large outer diameter to serve as a stopper is formed, as shown in FIG. 3 and FIG. 4. Accordingly, in the lower part of each through hole 21*a* of the main body 21, a large-diameter hole section 21*b* into which the corresponding head section 18*a* is inserted is formed. Also, in an upper end portion of each charging terminal 18, a stopper groove 18*b* is annularly formed to which a stopper member 23 such as an E-ring is attached.

Consequently, the plurality of charging terminals 18 is structured such that, when each charging terminal 18 is inserted from below into the corresponding through hole 21*a* formed in the main body 21 and the head sections 18*a* are arranged in the large-diameter hole sections 21*b* of the through holes 21*a*, the stopper grooves 18*b* in the upper end portions are exposed above the main body 21, and the stopper members 23 are attached to the exposed stopper grooves 18*b*, as shown in FIG. 4.

As a result, the plurality of charging terminals 18 is structured not to vertically slip out of the through holes 21*a* of the main body 21 when the head sections 18*a* at the lower ends are exposed to the outer surface side (the lower surface side in FIG. 4) of the back cover 8 from the attachment hole 20 of the back cover 8 and the upper end portions of the charging terminals 18 are exposed to the inner surface side (the upper surface side in FIG. 4) of the back cover 8, as shown in FIG. 4.

Also, on the upper end of each of the plural charging terminals 18, a connection projection 18*c* is formed which has a short diameter and is electrically connected to the circuit section (not shown in the drawings) of the timepiece module 9 in the wristwatch case 1 by a connection member 9*b* such as a flexible wiring substrate, as shown in FIG. 3 and FIG. 4. In addition, in the outer circumferential surfaces of the plurality of charging terminals 18, a plurality of waterproof grooves 18*d* is annularly provided.

In these waterproof grooves 18*d*, waterproof rings 24 are provided as shown in FIG. 4, and each waterproof ring 24 is structured such that its portion exposed from the corresponding waterproof groove 18*d* comes in pressure contact with the inner circumferential surface of the corresponding through hole 21*a* of the main body 21 so as to achieve waterproofing between the outer circumferential surface of each charging terminal 18 and the inner circumferential surface of each through hole 21*a* of the main body 21.

Figure 5:
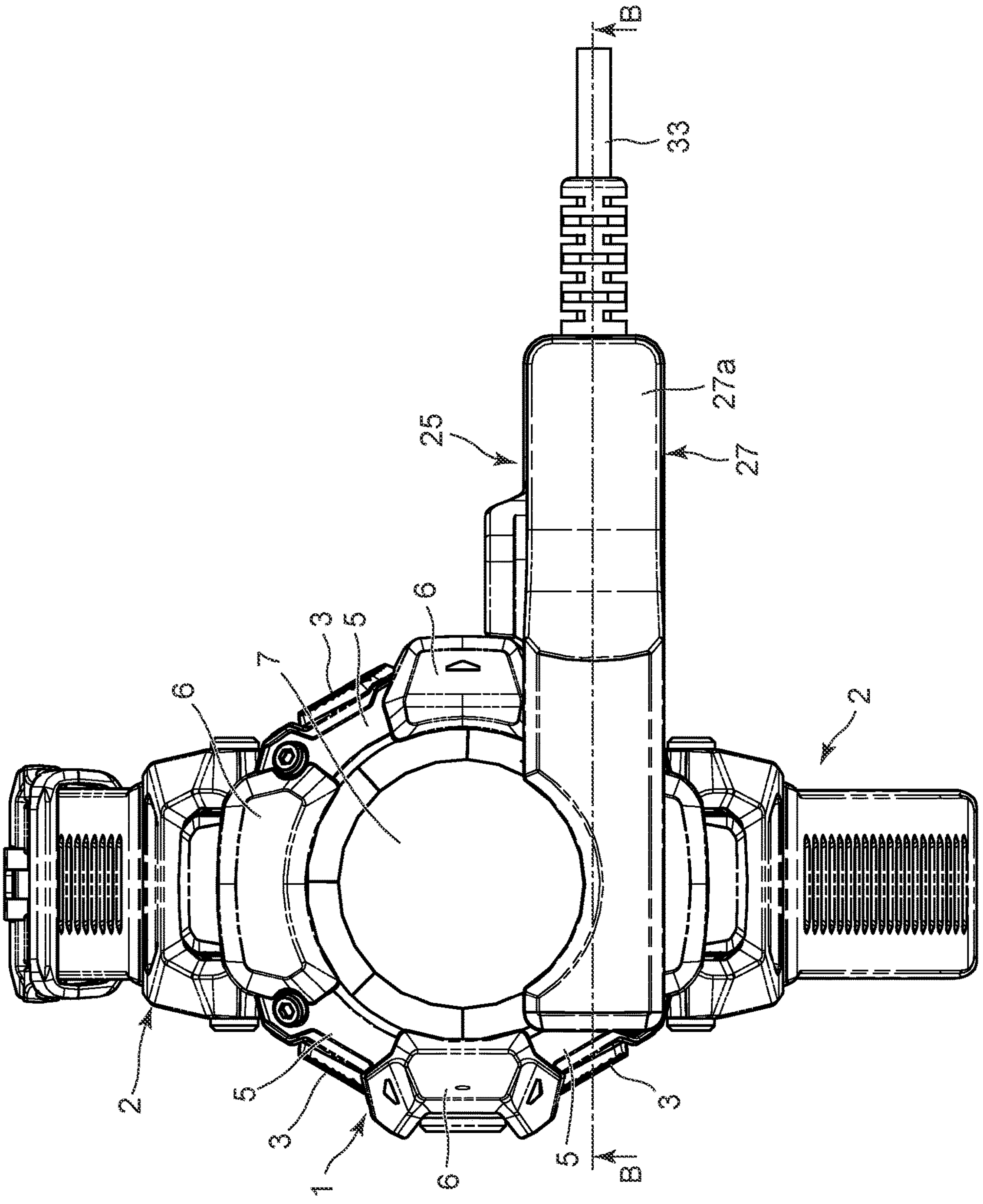
FIG. 5 is an enlarged front view showing the wristwatch of FIG. 1 to which a charging device has been attached.

The timepiece component 16 of the wristwatch case 1 is structured such that the charging device 25 which charges the rechargeable battery (not shown) of the timepiece module 9 is electrically connected thereto, as shown in FIG. 5 to FIG. 7. This charging device 25, which is an alligator-type clip device, includes a first hold-down section 26 and a second hold-down section 27, and is structured such that the first hold-down section 26 and the second hold-down section 27 are rotatably connected to each other by a holding shaft 28.

The first hold-down section 26 includes the above-described connection section 30 which is connected to the plurality of charging terminals 18 provided in the terminal attachment member 17 in the back cover 8, as shown in FIG. 6 and FIG. 7. This connection section 30 includes the connection body section 31 which is provided in the first hold-down section 26 while corresponding to the terminal attachment member 17 and protrudes toward the second hold-down section 27, and a plurality of electrode terminals 32 which is provided in the connection body section 31 and comes in contact with the plurality of charging terminals 18 of the terminal attachment member 17 so as to be electrically connected thereto.

The connection body section 31 is provided protruding outward from inside the first hold-down section 26, and this protruding end portion has the above-described frame-shaped projection 31*a* formed thereon, as shown in FIG. 6 and FIG. 7. The frame-shaped projection 31*a* is formed such that the shape of its outer circumferential surface is the same as the shape of the inner circumferential surface of the large-diameter hole section 20*b* of the attachment hole 20 in the back cover 8, and the shape of its inner circumferential surface is the same as the shape of the outer circumferential surface of the lower side of the main body 21 of the terminal attachment member 17.

That is, this frame-shaped projection 31*a* is structured to be inserted from below the back cover 8 into the restriction recess section 21*d* formed between the inner circumferential surface of the large-diameter hole section 20*b* of the attachment hole 20 in the back cover 8 and the outer circumferential surface of the lower side of the main body 21 of the terminal attachment member 17, as shown in FIG. 6 and FIG. 7. As a result, the connection body section 31 is structured to fix the position of the first hold-down section 26 with respect to the back cover 8 when the frame-shaped projection 31*a* on its end is inserted into the restriction recess section 21*d* formed between the inner circumferential surface of the large-diameter hole section 20*b* of the attachment hole 20 in the back cover 8 and the outer circumferential surface of the lower side of the main body 21 of the terminal attachment member 17.

The plurality of electrode terminals 32 is provided such that their end portions protrude into and exposed in the frame-shaped projection 31*a* of the connection body section 31 with each electrode terminal 32 being embedded in the connection body section 31 while corresponding to the plurality of charging terminals 18 of the terminal attachment member 17, as shown in FIG. 6 and FIG. 7. As a result, the plurality of electrode terminals 32 is structured to be pressed against the undersurfaces of the head sections 18*a* at the lower ends of the plurality of charging terminals 18 when the frame-shaped projection 31*a* of the connection body section 31 is inserted into the restriction recess section 21*d* formed in the undersurface of the back cover 8.

Also, the plurality of electrode terminals 32 is connected to an A/C (Alternating-Current) conversion section (not shown in the drawings) in the first hold-down section 26 via a connection substrate 32*a*, as shown in FIG. 6 and FIG. 7. To this A/C conversion section, a power cord 33 is connected. As a result, the plurality of electrode terminals 32 is structured such that electric power transmitted through the power cord 33 is converted by the A/C conversion section, supplied to these electrode terminals 32, and then supplied to the plurality of charging terminals 18 of the timepiece component 16.

On the other hand, the second hold-down section 27, which presses the wristwatch case 1 against the first hold-down section 26 so that the wristwatch case 1 is held therebetween, is structured to be rotatably attached to the first hold-down section 26 by the holding shaft 28, as shown in FIG. 5 and FIG. 6. On an end of the second hold-down section 27, a lever section 27*a* is formed projecting further rightward with respect to the holding shaft 28 in FIG. 9.

This second hold-down section 27 is forced to be rotated toward the first hold-down section 26 by a spring member 34 which is an energizing member provided on the holding shaft 28, as shown in FIG. 5 and FIG. 6. The spring member 34 is a torsion spring provided on the outer circumferential part of the holding shaft 28. One end section 34*a* of this spring member 34 is caught in the second hold-down section 27, and the other end section 34*b* is caught in the first hold-down section 26.

As a result, the charging device 25 is structured such that, when the lever section 27*a* of the second hold-down section 27 is pressed against the spring force of the spring member 34, the end portion of the second hold-down section 27 on the side opposite to the lever section 27*a* is rotated in a direction away from the end portion of the first hold-down section 26 on the connection section 30 side, whereby the space between the end portion of the first hold-down section 26 and the end portion of the second hold-down section 27 is enlarged so that the wristwatch case 1 is arranged between the end portion of the first hold-down section 26 and the end portion of the second hold-down section 27, as shown in FIG. 5 to FIG. 7.

In addition, this charging device 25 is structured such that, when the wristwatch case 1 is arranged between the end portion of the first hold-down section 26 and the end portion of the second hold-down section 27, the second hold-down section 27 is rotated centering on the holding shaft 28 by the spring force of the spring member 34, whereby the wristwatch case 1 is pressed against the first hold-down section 26, as shown in FIG. 5 to FIG. 7. Moreover, this charging device 25 is structured such that, when the wristwatch case 1 is pressed against the first hold-down section 26, the plurality of electrode terminals 32 is pressed against the plurality of charging terminals 28 of the timepiece component 16, and the rechargeable battery (not shown in the drawings) of the timepiece module 9 mounted in the wristwatch case 1 is charged in this state.

Next, a method for manufacturing the timepiece component 16 of this wristwatch is described.

Figure 8:
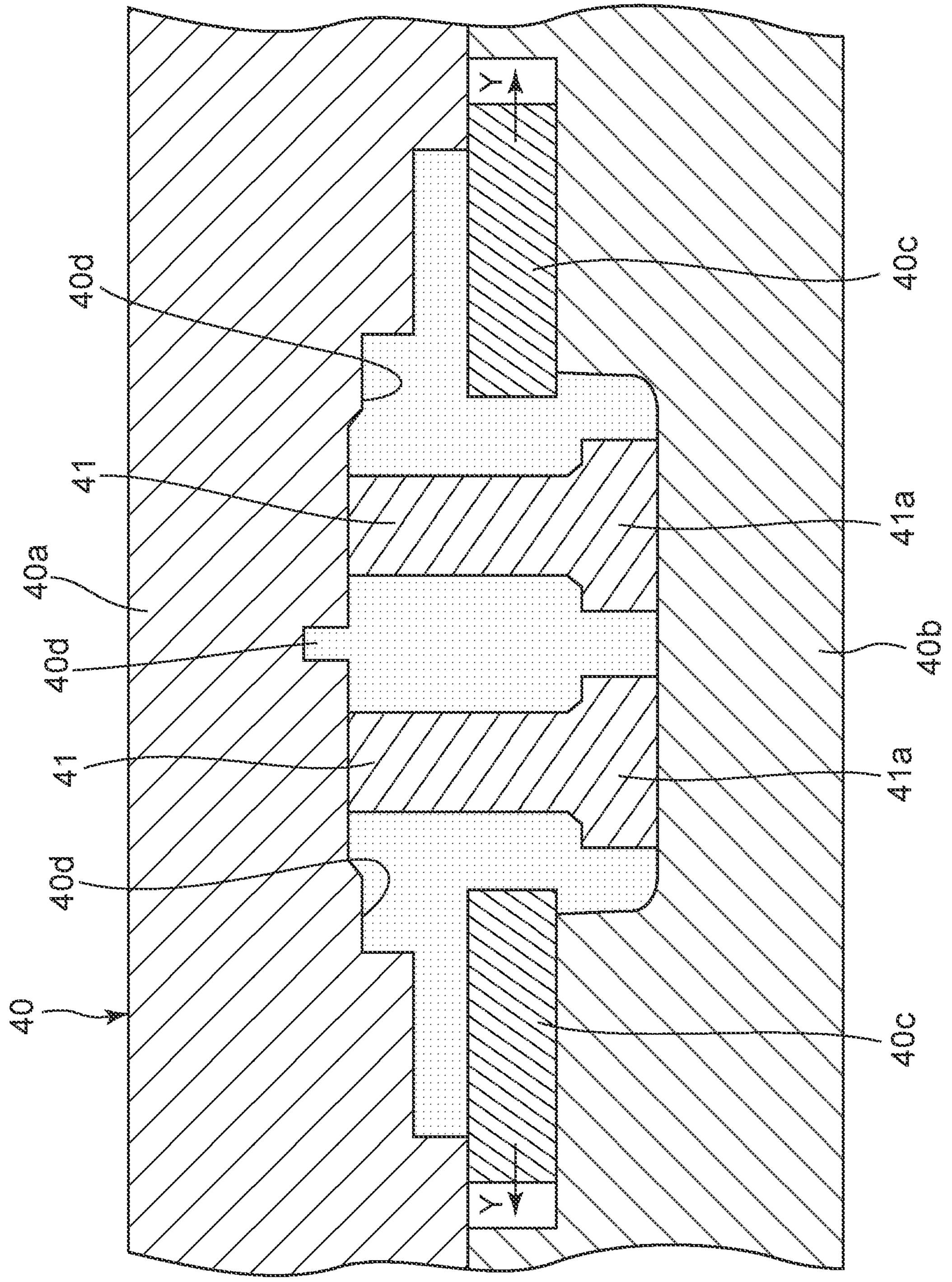
FIG. 8 is an enlarged cross-sectional view showing the molding of a terminal attachment member that is a primary molded product for a timepiece component shown in FIG. 4 by use of a first molding die.
Figure 9:
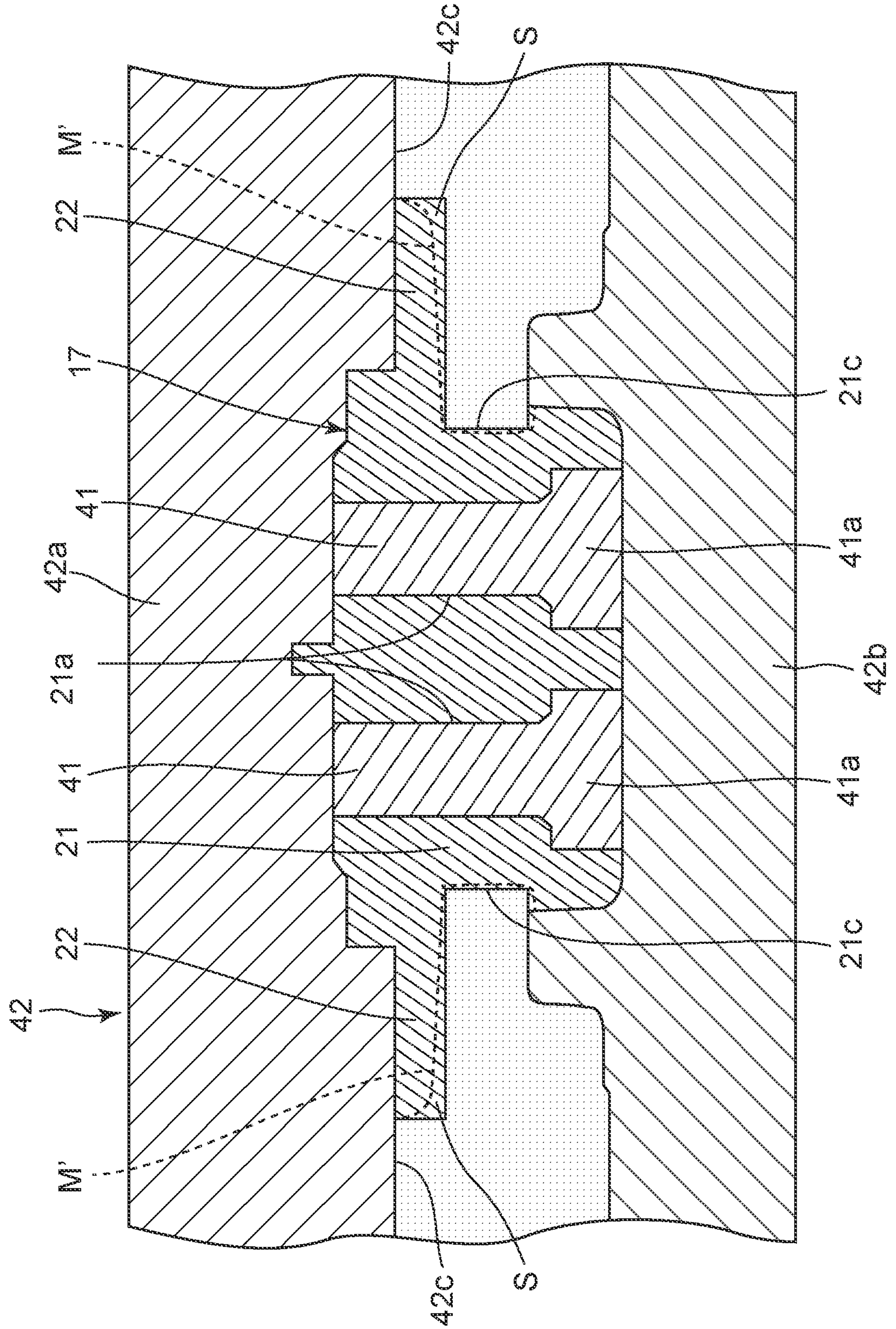
FIG. 9 is an enlarged cross-sectional view showing the molding of the back cover that is a secondary molded product by the terminal attachment member, which is the primary molded product shown in FIG. 8, being arranged in a second molding die.

This manufacturing method for the timepiece component 16 includes a first step of molding, by insulative first resin, the terminal attachment member 17 to which the charging terminals 18 are attached, and a second step of molding the back cover 8, which is the circumferential rim base, onto the outer circumferential surface of the terminal attachment member 17 by fiber-reinforced resin which is conductive second resin and whose rigidity and melting point are higher than those of the resin material of the terminal attachment member 17 such that the outer circumferential surface of the terminal attachment member 17 is melted and the back cover 8 is integrally molded with the terminal attachment member 17, as shown in FIG. 8 and FIG. 9.

At the first step of the present embodiment, a first molding die 40 is used to mold the terminal attachment member 17, as shown in FIG. 8. This first molding die 40 includes a first upper die 40*a*, a first lower die 40*b*, and slide cores 40*c*. In an area enclosed by the first upper die 40*a*, the first lower die 40*b*, and the slide cores 40*c*, a first cavity section 40*d* having the same shape as the terminal attachment member 17 is formed. The slide cores 40*c* herein are to form the attachment recess section 21*c* in the outer circumferential surface of the main body 21 of the terminal attachment member 17, and slidably arranged in the upper part of the first lower die 40*b*.

In the first cavity section 40*d* of the first molding die 40, a plurality of insertion pins 41 is provided which is used to form the through holes 21*a* that are insertion holes to which the plurality of charging terminals 18 is inserted, as shown in FIG. 8. More specifically, each insertion pin 41 has a substantially same size as each charging terminal 18, and is provided with a head section 41*a* having a substantially same size as the head section 18*a* of each charging terminal 18.

When the terminal attachment member 17 is to be molded by the first molding die 40, resin material that serves as a base is melted, injected to fill the first cavity section 40*d* of the first molding die 40, and solidified therein with the plurality of insertion pins 41 being arranged in the first cavity section 40*d* of the first molding die 40, as shown in FIG. 8. This resin material that serves as a base may be insulative resin such as polyamide resin or glass fiber resin acquired by glass fibers being mixed into polyamide resin.

As a result, the main body 21 and the flange 22 projecting from the outer circumferential surface of the main body 21 are integrally formed with the insertion pins 41 being arranged in the main body 21 of the terminal attachment member 17. In this state, the slide cores 40*c* of the first molding die 40 are slid in arrow directions Y shown in FIG. 8, and thereby pulled out from the attachment recess section 21*c* of the main body 21 of the terminal attachment member 17. Then, the first upper die 40*a* and the first lower die 40*b* are detached from each other, whereby the terminal attachment member 17 which is a primary molded product is detached from inside the first upper die 40*a* and the first lower die 40*b*.

At the second step, the back cover 8 is molded by the second molding die 42, as shown in FIG. 9. This second molding die 42 includes a second upper die 42*a* and a second lower die 42*b*. In the inner area of these upper and lower dies 42*a* and 42*b*, a second cavity section 42*c* is formed, which has the same shape as a combination of the terminal attachment member 17 and the back cover 8 in the second upper die 42*a* and the second lower die 42*b*.

In this second cavity section 42*c* of the second molding die 42, the terminal attachment member 17 which is the primary molded product having the insertion pins 41 is placed, as shown in FIG. 9. In this state, carbon fiber resin which is fiber-reinforced resin whose rigidity and melting point are higher than the resin material of the terminal attachment member 17 is melted, injected to fill the inner area of the second cavity section 42*c* of the second molding die 42 excluding the terminal attachment member 17, and solidified therein.

Here, since the melting point of the carbon fiber resin is higher than that of the resin material of the terminal attachment member 17, when the carbon fiber resin is being injected to fill the second cavity section 42*c* of the second molding die 42, surfaces of the terminal attachment member 17 made of the resin material whose melting point is lower than the carbon fiber resin, or in other words, its surfaces (welding surfaces M in FIG. 4) that come in contact with the back cover 8 such as the inner surface of the attachment recess section 21*c* in the outer circumferential surface of the main body 21 of the terminal attachment member 17 and the undersurface and side surface of the flange 22 of the terminal attachment member 17 are melted at the molding temperature of the back cover 8, that is, the melting temperature of the carbon fiber resin, whereby a welding layer S composed of the resin material of the terminal attachment member 17 and the carbon fiber resin is formed, as shown in FIG. 9. Note that dotted lines M' in FIG. 9 indicate the outer edge of the formed welding layer S. Via this welding layer S which is a layer portion formed along the welding surfaces M, the terminal attachment member 17 is welded to the attachment hole 20 of the back cover 8.

As such, the welding layer S is formed by the flange 22 of the terminal attachment member 17 that is a primary molded product being melted, as shown in FIG. 9. That is, at the end of the second step, the flange 22 in a cross-sectional view has been deformed as compared to that at the end of the first step, and the welding layer S has been formed between the terminal attachment member 17 and the back cover 8, as shown in FIG. 9. In addition, at the end of the second step, the width of a portion of the flange 22 of the terminal attachment member 17 in the thickness direction (vertical direction in FIG. 4 or FIG. 9) of the back cover 8 on its leading end side, that is, on the side far from the insertion pins 41 (FIG. 9) or the charging terminals 18 (FIG. 4) is shorter than that on its base end side, that is, on the side close to the insertion pins 41 (FIG. 9) or the charging terminals 18 (FIG. 4) by the flange 22 being melted during the second step.

Then, after the carbon fiber resin hardens, the second upper die 42*a* and the second lower die 42*b* of the second molding die 42 are detached from each other, whereby a secondary molded product where the terminal attachment member 17 and the back cover 8 have been unified is detached therefrom. In this secondary molded product, the inner surface of the attachment recess section 21*c* in the outer circumferential surface of the main body 21 of the terminal attachment member 17 and the undersurface and side surface of the flange 22 of the terminal attachment member 17 have been melted and fixed to the back cover 8, whereby high waterproofness to withstand a pressure of about twenty atmospheres is achieved at the portions where the terminal attachment member 17 and the back cover 8 have been welded to each other.

As described above, at the first step, the terminal attachment member 17 is formed including the main body 21 which is arranged in the attachment hole 20 that is formed in the back cover 8 at the second step, and the flange 22 provided projecting from the outer circumferential part of the main body 21, as shown in FIG. 8. At the second step, the back cover 8 is formed including the attachment hole 20 where the main body 21 of the terminal attachment member 17 is arranged, and the flange 22 of the terminal attachment member 17 is arranged on the inner surface side of the back cover 8 and melted to be fixed to the back cover 8, as shown in FIG. 9. By the presence of this flange 22, the area of the welding surfaces M of the terminal attachment member 17 and the back cover 8 is enlarged, whereby the welding strength between the terminal attachment member 17 and the back cover 8 is ensured and high waterproofness is achieved.

Also, at the first step, the terminal attachment member 17 is molded in the state where the insertion pins 41 for forming the through holes 21*a* that are insertion holes into which the charging terminals 18 are inserted have been arranged in the terminal attachment member 17, as shown in FIG. 8. At the second step, the back cover 8 is molded with the insertion pins 41 being arranged in the terminal attachment member 17, as shown in FIG. 9. Therefore, even though the melting point of the resin material of the terminal attachment member 17 is lower than the melting point of the carbon fiber resin of the back cover 8, deformation of the terminal attachment member 17 by which the through holes 21*a* collapse by heat of the carbon fiber resin does not occur, whereby the above-described secondary molded product can be precisely and favorably formed.

This method for manufacturing the timepiece component 16 further includes a third step of attaching the plurality of charging terminals 18 to the secondary molded product. At this third step, first, the plurality of insertion pins 41 arranged in the terminal attachment member 17 that is the secondary molded product is removed therefrom. As a result, the plurality of through holes 21*a* are accurately formed in the terminal attachment member 17. Here, these through holes 21*a* are accurately and favorably formed without being deformed and collapsing by the heat of the back cover 8, that is, the heat of the carbon fiber resin. Also, on the lower sides of the plurality of through holes 21*a*, the large-diameter hole sections 21*b* in which the head sections 18*a* of the charging terminals 18 are arranged are formed by the head sections 41*a* of the insertion pins 41.

Then, the plurality of charging terminals 18 is attached to the plurality of through holes 21*a* of the terminal attachment member 17 serving as the secondary molded product, or in other words, the terminal attachment member 17 integrally formed with the back cover 8. Here, before this attachment, the plurality of waterproof rings 24 is attached to the plurality of waterproof grooves 18*d* formed in the outer circumferential surface of each charging terminal 18. In this state, the small-diameter connection projections 18*c* of the plurality of charging terminals 18 are inserted from below into the plurality of through holes 21*a* of the terminal attachment member 17, and the head sections 18*a* of the plurality of charging terminals 18 are arranged in the large-diameter hole sections 21*b* of the plurality of through holes 21*a*.

Here, the plurality of waterproof rings 24 arranged in the plurality of waterproof grooves 18*d* formed in the outer circumference surfaces of the charging terminals 18 come in pressure contact with the inner surfaces of the plurality of through holes 21*a*, whereby waterproofing between the plurality of through holes 21*a* and the plurality of charging terminals 18 is achieved. Also, here, the connection projections 18*c* of the plurality of charging terminals 18 project above the terminal attachment member 17, and the stopper members 23 are attached to the stopper grooves 18*b* formed below these connection projections 18*c*. As a result, the plurality of charging terminals 18 is attached to the terminal attachment members 17, whereby the manufacture of the timepiece component 16 is completed.

Next, the attachment of this timepiece component 16 to the wristwatch case 1 of the wristwatch is described. In this attachment, first, the watch glass 7 is attached to the upper opening of the main body case 4 of the wristwatch case 1. In this state, the first exterior case 5 and the second exterior case 6 are attached to the outer circumferential part of the main body case 4, whereby the assembly of the wristwatch case 1 is completed. Then, the plurality of switch sections 3 is attached to side portions of the wristwatch case 1, and the timepiece module 9 is mounted in the wristwatch case 1.

In this state, the back cover 8 which is the circumferential rim base of the timepiece component 16 is attached to the lower part of the wristwatch case 1. In this attachment, the connection projections 18*c* of the plurality of charging terminals 18 provided in the terminal attachment member 17 are electrically connected to the circuit section (not shown in the drawings) of the timepiece module 9 by the connection member 9*b*, and also the sensor device 11 is electrically connected to the circuit section (not shown in the drawings) of the timepiece module 9. In this state, the back cover 8 and the waterproof ring 8*a* are attached to the lower part of the wristwatch case 1 by the plurality of screws 8*b*. As a result, the assembly of the wristwatch which can be charged by the charging device 25 is completed.

Next, a case is described in which the wristwatch is charged by the charging device 25.

In this case, first, the lever section 27*a* of the second hold-down section 27 of the charging device 25 is pressed against the spring force of the spring member 34. As a result, the end portion of the hold-down section 27 on the side opposite to the lever section 27*a* is rotated in the direction away from the end portion of the first hold-down section 26 on the connection section 30 side, whereby the space between the end portion of the first hold-down section 26 and the end portion of the second hold-down section 27 is enlarged. In this state, the wristwatch case 1 is arranged between the end portion of the first hold-down section 26 and the end portion of the second hold-down section 27.

In this arrangement, the frame-shaped projection 31*a* of the connection body section 31 protruding from the inner side of the hold-down section 26 to the outside is positioned corresponding to the restriction recess section 21*d* formed between the inner circumferential surface of the large-diameter hole section 20*b* of the attachment hole 20 in the back cover 8 and the outer circumferential surface of the lower side of the main body 21 of the terminal attachment member 17. In this state, when the lever section 27*a* is released from being pressed, the second hold-down section 27 is rotated centering on the holding shaft 28 by the spring force of the spring member 34, whereby the wristwatch case 1 is pressed against the first hold-down section 26. As a result, the frame-shaped projection 31*a* of the connection body section 31 is inserted into the restriction recess section 21*d* formed between the inner circumferential surface of the large-diameter hole section 20*b* of the attachment hole 20 in the back cover 8 and the outer circumferential surface of the lower side of the main body 21 of the terminal attachment member 17.

Here, the frame-shaped projection 31*a* is held by the restriction recess section 21*d* formed between the inner circumferential surface of the large-diameter hole section 20*b* of the attachment hole 20 in the back cover 8 and the outer circumferential surface of the lower side of the main body 21 of the terminal attachment member 17, whereby the position of the first hold-down section 26 with respect to the back cover 8 is fixed. In addition, the leading ends of the plurality of electrode terminals 32 mounted in the connection body section 31 are pressed against the undersurfaces of the head sections 18*a* at the lower ends of the plurality of charging terminals 18 in the terminal attachment member 17.

As a result, the plurality of electrode terminals 32 of the charging device 25 is electrically connected to the plurality of charging terminals 18 of the timepiece component 16. In this state, since the plurality of electrode terminals 32 has been connected to the A/C conversion section (not shown in the drawings) in the first hold-down section 26 by the connection substrate 32*a*, electric power from the power cord 33 is converted in the A/C conversion section, supplied to the plurality of electrode terminals 32, and then supplied to the plurality of charging terminals 18 of the timepiece component 16, whereby the rechargeable battery (not shown in the drawings) of the timepiece module 9 mounted in the wristwatch case 1 is charged.

In the case of the wristwatch described in Japanese Patent Application Laid-Open (Kokai) Publication No. 2018-169360, the base is conductive. Therefore, there is a problem in that, if a terminal (such as a charging terminal) is provided in the base, this charging terminal and the base are electrically connected to each other, whereby a function as a charging terminal is lost.

In contrast, the timepiece component 16 of the wristwatch of the present disclosure includes the back cover 8 which is the circumferential rim base that is provided with the attachment hole 20 and attached to the wristwatch case 1, the terminal attachment member 17 which is the center base that is arranged in and attached to the attachment hole 20 of the back cover 8, and the charging terminals 18 provided in the terminal attachment member 17 and exposed therefrom. Here, the terminal attachment member 17 is made of the insulative first resin, the back cover 8 is made of the conductive second resin, and the welding layer S lies between the terminal attachment member 17 and the back cover 8. As a result of this structure, the back cover 8 and each charging terminal 18 are prevented from being electrically connected to each other.

Also, in the case of the timepiece component 16 of this wristwatch, the terminal attachment member 17 and the back cover 8 are integrally formed by the outer circumferential surface of the terminal attachment member 17 and that of the back cover 8 being welded to each other. As a result of this structure, the terminal attachment member 17 and the back cover 8 can be firmly fixed to each other with insulation between the back cover 8 and the charging terminals 18 being ensured, whereby airtightness and waterproofness between the terminal attachment member 17 and the back cover 8 can be ensured.

Moreover, in the case of the timepiece component 16 of this wristwatch including the back cover 8 which is the circumferential rim base that is provided with the attachment hole 20 and attached to the wristwatch case 1, the terminal attachment member 17 which is arranged in and attached to the attachment hole 20 of the back cover 8, and the charging terminals 18 provided in the terminal attachment member 17 and exposed therefrom, the terminal attachment member 17 is made of the insulative first resin, the back cover 8 is made of the conductive second resin, and the terminal attachment member 17 and the back cover 8 are integrally formed by the outer circumferential surface of the terminal attachment member 17 and that of the back cover 8 being welded to each other. This structure enables slimming down and weight saving while preventing the back cover 8 and the charging terminals 18 form being electrically connected to each other.

More specifically, in the case of the timepiece component 16 of this wristwatch, the back cover 8 and the terminal attachment member 17 are integrally formed by the back cover 8 melting the outer circumferential surface of the terminal attachment member 17 by the fiber-reinforced resin whose rigidity is higher than that of the terminal attachment member 17. Accordingly, the back cover 8 and each charging terminal 18 are prevented from being electrically connected to each other, waterproofing between the back cover 8 and the terminal attachment member 17 is ensured without waterproof packings, and the back cover 8 can be thinly formed to achieve slimming down and weight saving.

Also, in the case of the timepiece component 16 of this wristwatch, the back cover 8 is formed using the fiber-reinforced resin whose rigidity is higher than that of the first resin. Accordingly, even though the back cover 8 is thinly formed, its rigidity can be ensured. That is, the slimming down and weight saving of the back cover 8 can be achieved.

Moreover, in the case of the timepiece component 16 of this wristwatch, since the back cover 8 which serves as the circumferential rim base is made of the carbon fiber resin using carbon fibers as reinforcement fibers, the strength of the back cover 8 can be ensured, whereby the back cover 8 can be thinly formed, and lightened by the carbon fiber resin. That is, further slimming down and weight saving can be achieved.

Furthermore, in the case of the timepiece component 16 of this wristwatch, since the back cover 8 which serves as the circumferential rim base is made of the carbon fiber resin which is fiber-reinforced resin whose melting point is higher than that of the resin material of the terminal attachment member 17, the surfaces of the resin material of the terminal attachment member 17 whose melting point is lower than the carbon fiber resin of the back cover 8, which come in contact with the back cover 8, can be unfailingly and favorably melted by the carbon fiber resin of the back cover 8 when the back cover 8 is integrally formed with the terminal attachment member 17 by two-color molding, whereby the welding surfaces M of the back cover 8 and the terminal attachment member 17 can be reliably fixed to each other, and waterproofing between the back cover 8 and the terminal attachment member 17 can be ensured.

Still further, in the timepiece component 16 of this wristwatch, the terminal attachment member 17 includes the main body 21 which is arranged in the attachment hole 20 of the back cover 8, and the flange 22 which is formed on the outer circumferential part of the main body 21 and melted and fixed to the inner surface of the back cover 8. As a result, the areas of the welding surfaces M of the terminal attachment member 17 and the back cover 8 are large by the presence of the flange 22 formed on the outer circumferential part of the main body 21, whereby the terminal attachment member 17 can be reliably and firmly welded to the back cover 8 when the terminal attachment member 17 and the back cover 8 are integrally formed.

Yet still further, in the case of the timepiece component 16 of this wristwatch, the flange 22 is formed such that its sideward projecting length from the outer circumferential surface of the main body 21 is substantially equal to or longer than the length of the back cover 8 in the thickness direction. As a result of this structure, even though the back cover 8 is thin, the areas of the welding surfaces M of the terminal attachment member 17 and the back cover 8 are sufficiently larger than the area of the outer circumferential surface of the main body 21, whereby the terminal attachment member 17 and the back cover 8 can be further reliably and firmly welded to each other.

That is, if the flange 22 is not formed on the outer circumferential part of the main body 21, the cross-sectional length of the area where the back cover 8 and the terminal attachment member 17 come in contact with each other is equal to the length of the back cover 8 in the thickness direction at the longest. However, when the flange 22 is formed on the outer circumferential part of the main body 21, the length of the area where the back cover 8 and the terminal attachment member 17 come in contact with each other becomes longer than the length of the back cover 8 in the thickness direction, whereby the cross-sectional length of the area where the back cover 8 and the terminal attachment member 17 come in contact with each other becomes longer.

When the cross-sectional length of the contact area becomes longer, the areas of the above-described welding surfaces M become larger, and the welding strength between the terminal attachment member 17 and the back cover 8 becomes higher. Here, the waterproof performance of the welded portions of the back cover 8 and the terminal attachment member 17 depends on at least the welding strengths and cross-sectional lengths of the welding surfaces M. That is, the waterproof performance of the welded portions is higher when the welding strengths of the welding surfaces M are greater and the cross-sectional lengths of the welding surfaces M are longer. In the timepiece component 16 of this wristwatch, by the flange 22 which projects sideward from the main body 21 being formed on the terminal attachment member 17, the waterproof performance when the terminal attachment member 17 is welded to the back cover 8 having a certain thickness becomes higher as compared to the case where the flange 22 is not provided.

Also, the method for manufacturing the timepiece component 16 of this wristwatch includes the first step of molding, by the insulative first resin, the terminal attachment member 17 to which the charging terminals 18 are attached, and the second step of molding the back cover 8 which is the circumferential rim base by the conductive second resin, in which a welding layer is formed to lie between the back cover 8 and the terminal attachment member 17. By this method, the back cover 8 and the charging terminals 18 are not electrically connected to one another.

Moreover, in the method for manufacturing the timepiece component 16 of this wristwatch, at the second step, the outer circumferential surface of the terminal attachment member 17 and the outer circumferential surface of the back cover 8 are welded to each other so that the terminal attachment member 17 and the back cover 8 are integrally formed. By this method, the back cover 8 and the charging terminals 18 are not electrically connected to one another, waterproofing between the back cover 8 and the terminal attachment member 17 is ensured without using waterproof packings, and the back cover 8 can be thinly formed.

That is, since the method for manufacturing the timepiece component 16 of this wristwatch includes the first step of molding, by the insulative first resin, the terminal attachment member 17 to which the charging terminals 18 are attached, and the second step of molding the back cover 8 by the conductive second resin and welding the outer circumferential surface of the terminal attachment member 17 and the outer circumferential surface of the back cover 8 to each other so that the terminal attachment member 17 and the back cover 8 are integrally formed, the back cover 8 and the charging terminals 18 are not electrically connected to one another.

Furthermore, in the method for manufacturing the timepiece component 16 of this wristwatch, at the second step, the back cover 8 that serves as the circumferential rim base is formed by the fiber-reinforced resin whose rigidity and melting point are higher than those of the resin material of the terminal attachment member 17. Therefore, even though the back cover 8 is thinly formed, its rigidity can be ensured. That is, the slimming down and weight saving of the back cover 8 can be achieved.

More specifically, in the manufacturing method of the timepiece component 16 of this wristwatch, when the back cover 8 is being molded at the second step by the fiber-reinforced resin whose rigidity is higher than the resin material of the terminal attachment member 17, this back cover 8 melts the outer circumferential surface of the terminal attachment member 17, whereby the back cover 8 and the terminal attachment member 17 are integrally formed. By this step, waterproofing between the back cover 8 and the terminal attachment member 17 can be ensured without using waterproof packings, and the back cover 8 can be thinly formed. As a result, the slimming down and weight saving of the wristwatch can be achieved.

Also, in the manufacturing method of the timepiece component 16 of this wristwatch, since the back cover 8 which serves as the circumferential rim base is molded by the carbon fiber resin using carbon fibers as reinforcement fibers, the strength of the back cover 8 can be ensured by this carbon fiber resin. Therefore, the back cover 8 can be thinly formed, and lightened by the carbon fiber resin. That is, further slimming down and weight saving can be achieved.

Moreover, in the manufacturing method of the timepiece component 16 of this wristwatch, since the back cover 8 which serves as the circumferential rim base is made of the carbon fiber resin which is fiber-reinforced resin whose melting point is higher than that of the resin material of the terminal attachment member 17, the surfaces of the resin material of the terminal attachment member 17 whose melting point is lower than the carbon fiber resin of the back cover 8, which come in contact with the back cover 8, can be unfailingly and favorably melted by the carbon fiber resin of the back cover 8 when the back cover 8 is integrally formed with the terminal attachment member 17 by two-color molding, whereby the welding surfaces M of the back cover 8 and the terminal attachment member 17 can be reliably fixed to each other, and waterproofing between the back cover 8 and the terminal attachment member 17 can be ensured.

Furthermore, in the manufacturing method of the timepiece component 16 of this wristwatch, at the first step, the terminal attachment member 17 is formed including the main body 21 which is arranged in the attachment hole 20 that is formed in the back cover 8 at the second step, and the flange 22 provided projecting from the outer circumferential part of the main body 21. Then, at the second step, the back cover 8 is formed including the attachment hole 20 where the main body 21 of the terminal attachment member 17 is arranged, the flange 22 of the terminal attachment member 17 is arranged on the inner surface side of the back cover 8, and the surfaces of the flange 22 which are in contact with the back cover 8 are melted and fixed to the back cover 8. Here, by the presence of the flange 22, the areas of the welding surfaces M of the terminal attachment member 17 and the back cover 8 are large, whereby the terminal attachment member 17 and the back cover 8 can be reliably and firmly welded to each other.

Still further, in the manufacturing method of the timepiece component 16 of this wristwatch, at the first step, the terminal attachment member 17 is molded in which the insertion pins 41 for forming the through holes 21*a* that are insertion holes into which the charging terminals 18 are inserted have been arranged. Then, at the second step, the back cover 8 is molded with the insertion pins 41 being arranged in the terminal attachment member 17. Therefore, even though the melting point of the resin material of the terminal attachment member 17 is lower than the melting point of the carbon fiber resin of the back cover 8, the through holes 21*a* can be precisely and favorably formed in the terminal attachment member 17 without being deformed, whereby the charging terminals 18 can be precisely and favorably attached to the through holes 21*a*.

Yet still further, the manufacturing method of the timepiece component 16 of this wristwatch further includes the third step of attaching the charging terminals 18 to the through holes 21*a* which are insertion holes in the terminal attachment member 17 integrally formed with the back cover 8. At this third step, the insertion pins 41 arranged in the terminal attachment member 17 at the first step are removed from the terminal attachment member 17, whereby the through holes 21*a* are formed in the terminal attachment member 17. Accordingly, only by being inserted into these through holes 21*a* of the terminal attachment member 17, the charging terminals 18 can be reliably and favorably attached while being exposed from the inner surface and outer surface of the terminal attachment member 17.

In the above-described embodiment, the charging terminals 18 are provided in and exposed from the terminal attachment member 17. However, the terminals of the present disclosure are not necessarily required to be charging terminals, and any terminal can be used as long as it is a connection terminal such as a communication terminal.

Also, in the above-described embodiment, the present disclosure has been applied in a wristwatch. However, the present disclosure is not necessarily required to be applied in a wristwatch. For example, the present disclosure is applicable to various types of timepieces such as a travel watch, an alarm clock, a table clock, and a wall clock.

In addition, the present disclosure is not necessarily required to be applied in timepieces, and can be applied in electronic devices such as cell-phones and portable information terminals. In that case, although the back cover 8 has been described as the circumferential rim base of the above-described embodiment, the circumferential rim base of the present disclosure is not necessarily required to be a back cover, and may be any object as long as it can be attached to a housing.

While the present invention has been described with reference to the preferred embodiments, it is intended that the invention be not limited by any of the details of the description therein but includes all the embodiments which fall within the scope of the appended claims.

What is claimed is:

1. A timepiece component comprising:

a circumferential rim base provided with an attachment hole and attached to a case, the attachment hole having an inner circumferential surface;

a center base arranged in the attachment hole of the circumferential rim base, the center base comprising a main body, a flange projecting circumferentially outward of the main body, and a fitting recess in the main body that is configured to receive the inner circumferential surface of the attachment hole, a terminal provided in the center base in a manner to be exposed from the center base, wherein the center base is formed of insulative first resin, wherein the circumferential rim base is formed of conductive second resin, and wherein a side surface of the flange, an undersurface of the flange, and an inner surface of the fitting recess of the center base and corresponding portions of an outer circumferential surface of the circumferential rim base are melted to each other to form a welding layer to attach the center base to the circumferential rim base.

2. The timepiece component according to claim 1, wherein the center base and the circumferential rim base are integrally formed by the side surface of the flange, the undersurface of the flange, and the inner surface of the fitting recess of the center base and the outer circumferential surface of the circumferential rim base being welded to each other.

3. The timepiece component according to claim 1, wherein the circumferential rim base is formed of fiber-reinforced resin whose rigidity is higher than rigidity of the first resin.

4. The timepiece component according to claim 1, wherein the circumferential rim base is formed of carbon fiber resin using carbon fibers as reinforcement fibers.

5. The timepiece component according to claim 1, wherein the circumferential rim base is formed of fiber-reinforced resin whose melting point is higher than melting point of the first resin.

6. The timepiece component according to claim 1, wherein the flange is formed such that a sideward projecting length from an outer circumferential surface of the main body is longer than a length of the circumferential rim base in a thickness direction.

7. A timepiece comprising:

the timepiece component according to claim 1; and the case.

* * * * *